Patented Nov. 30, 1943

2,335,795

UNITED STATES PATENT OFFICE

2,335,795

PRODUCTION OF ALIPHATIC ALCOHOLS

Walter Reppe, Willi Schmidt, Alfred Schulz, and Hans Wenderlein, Ludwigshafen-on-the-Rhine, Germany, assignors, by mesne assignments, to General Aniline & Film Corporation, New York, N. Y., a corporation of Delaware No Drawing. Original application April 4, 1939, Serial No. 265,970. Divided and this application December 12, 1940, Serial No. 369,822. In Germany April 16, 1938

3 Claims. (Cl. 260—642)

The present invention relates to the production of aliphatic alcohols. This application is a division of an application filed April 4, 1939, and given Serial No. 265,970.

We have found that aliphatic alcohols are obtained by leading butin-2-diol-1.4 or its 1.4-substitution products, in particular its lower alkyl substitution products, such as 1.4-dimethyl-, 1.4-diethyl-, 1.1.4.4-tetramethyl-1.4-dimethyl-1.4-diethylbutin-2-diol, together with hydrogen over hydrogenation catalysts.

In this way it is possible to prepare pure hydrogenation products of butin-2-diol-1.4 and its substitution products, and by suitable choice of the reaction conditions, it is not only possible to hydrogenate butindiols in excellent yields into 1.4-butane-diols, but also to obtain 1.4-butene-diols, normal butanols or tetrahydrofuranes in uninterrupted reaction.

Among initial materials for the process according to this invention there are suitable not only butin-2-diol-1.4 but also its 1.4-substitution products such as can be obtained for example by the condensation of acetylene with aldehydes and ketones in the presence of the acetylides of copper, silver, gold or mercury.

The hydrogenation is most suitably carried out in the liquid phase, and it is preferable to use aqueous solutions of the butindiols or also their solutions in organic solvents, such as alcohols or dioxane or mixtures of the same. Organic solvents are used in particular for the hydrogenation of butindiols difficultly soluble in water.

The hydrogen used in the hydrogenation may be diluted, when working in the gas phase and also when working in the liquid phase, for example with carbon dioxide, nitrogen, low molecular saturated hydrocarbons, ethers or alcohols.

The catalysts used for adding on hydrogen to carbon-carbon, carbon-nitrogen, carbon-oxygen or nitrogen-oxygen multiple linkages are generally speaking suitable as catalysts according to this invention. When working in the liquid phase they may be suspended in the initial materials or their solutions or rigidly arranged in a vessel through which the initial material flows together with hydrogen or applied to suitable filler bodies. When working in the gas phase, shaped catalysts or catalysts applied to carriers must be used. Metal catalysts applied to carriers are especially suitable, as for example nickel, copper or cobalt or mixtures of these metals with one another or with other metals, such as chromium, e. g., mixtures of nickel (10 to 15 per cent), copper (5 to 10 per cent) and chromium (0.5 to 1 per cent), the rest being carrier substance. Chromium or chromium compounds, such as chromic acid, chromic nitrate or ammonium bichromate are good activating agents for non-noble metallic hydrogenation catalysts.

The nature and amount of the final products depend on the reaction conditions and on the nature and the activity of the catalyst. Thus for example noble metals or non-noble metals, such as nickel, copper or cobalt catalysts or mixtures thereof, if desired activated with chromium, at ordinary or slightly elevated temperatures and increased hydrogen pressures yield butanediols especially smoothly. Suitable temperatures are within the range of from 15° to 150° C., whereas the pressures may exceed 10 atmospheres up to 50, 100, 200, 500 or 800 atmospheres or more, the upper limit depending on the stability of the reaction vessel. The best yields per unit of space and time are obtained when using temperatures of from about 15 to 100° C. and hydrogen pressures of more than 200 atmospheres.

If care be taken for a diminution in the activity of the catalysts, as for example by using a platinum catalyst which is applied to an acid active carbon or by mixing carbon monoxide with the hydrogen when using a nickel, cobalt or copper catalyst or by using an initial material containing halogen or phosphate, butene-diols are obtained at gentle temperatures, e. g., from 20° to 80° C., and corresponding pressures, e. g., 30 to 150 atmospheres. Less active catalysts are suitable for the partial saturation of the acetylenic linkage, for example sulphides, such as molybdenum sulphide or the oxides of copper, nickel, chromium, or mixtures thereof, if desired, admixed with barium or zinc.

If the hydrogenation is to be conducted to yield normal butanols, catalysts are preferable which are suitable for the preparation of alcohols from acids or acid derivatives, especially copper or nickel catalysts or copper-nickel catalysts, if desired, in the activated form, applied to carriers, e. g., silica gel, pumice stone, aluminum oxide and the like. Thus by hydrogenating butin-2-diol-1.4 with the aid of a copper catalyst applied to silica gel, mixtures of butane-diol-1.4 and normal butanol in varying proportions are obtained according to the temperature and pressure conditions. The higher the temperature chosen, the more the relative proportions are displaced in favor of butanol. Especially good yields of butanol are obtained at temperatures above 100° C., for example at temperatures between 130° and 200° C.

By working at still higher temperatures, preferably above 200° C., tetrahydrofuranes are directly formed in the hydrogenation of butin-diols with simultaneous splitting off of water. In this case it is preferable to hydrogenate in the gas phase; atmospheric or reduced pressure may be used. The catalysts are preferably used applied to carriers or in the form of mixed catalysts which act at the same time to split off water.

In the preparation of butane-diols it is preferable to reduce the catalysts before their use or to use catalysts which are readily converted into a highly active state under the reaction conditions.

The following example will further illustrate how this invention may be carried out in practice, but the invention is not restricted to this example. The parts are by volume unless otherwise stated.

*Example*

For the hydrogenation there is used a vertical high-pressure tube containing 1900 parts of a copper catalyst on silica gel. 300 parts per hour of an aqueous 35 per cent solution of butin-2-diol-1.4 are supplied and hydrogen is pumped in circulation under a pressure of 200 atmospheres therethrough. At a temperature of 120° C. the yield of normal butanol is from 62 to 68 per cent and that of butane-diol-1.4 from 30 to 35 per cent. By raising the temperature to from 140° to 150° C., the yield of normal butanol may be increased to more than 75 per cent of the theoretical yield under otherwise identical conditions.

What we claim is:

1. The production of aliphatic alcohols which comprises leading in the liquid phase a member of the group consisting of butin-2-diol-1.4 and its 1.4-substitution products over a metallic copper catalyst at temperatures between 100 and 200° C. and continuously circulating hydrogen through the reaction zone.

2. The production of butanol which comprises leading in the liquid phase butin-2-diol-1.4 over a metallic copper catalyst applied to a carrier at temperatures between 100 and 200° C. and continuously circulating hydrogen under superatmospheric pressure through the reaction zone.

3. The production of butanol which comprises leading an aqueous solution of butin-2-diol-1.4 over a metallic copper catalyst applied to a carrier at temperatures between 100 and 200° C. and continuously circulating hydrogen under superatmospheric pressure through the reaction zone.

WALTER REPPE.
WILLI SCHMIDT.
ALFRED SCHULZ.
HANS WENDERLEIN.